June 27, 1933.  R. M. NARDONE  1,916,126
DRIVING MECHANISM
Filed Sept. 19, 1930

INVENTOR
Romeo M. Nardone.
BY F. B. Smith.
ATTORNEY

Patented June 27, 1933

1,916,126

UNITED STATES PATENT OFFICE

ROMEO M. NARDONE, OF EAST ORANGE, NEW JERSEY, ASSIGNOR TO EC PSE AVIATION CORPORATION, OF EAST ORANGE, NEW JERSEY, A CORPORATION OF  W JERSEY

DRIVING MECHANISM

Application filed September 19, 1930. Serial No. 483,063.

This invention relates to driving mechanism, and more particularly to driving mechanism having means for physically connecting a driving and a driven member.

One object of the present invention is to provide a novel driving mechanism in which a frictional engagement is effected between the driving and driven members.

Another object of the invention is to provide in a driving mechanism of the above character, a novel construction wherein centrifugal force operates to maintain a frictional engagement between the driving and driven members.

Another object is to provide a driving mechanism embodying a construction possessing certain advantages from the standpoint of compactness and simplicity.

A further object is to provide a novel driving mechanism wherein a variable driving torque is produced between the driving and driven members, the driving torque being proportional to the speed of rotation.

Another object is to provide auxiliary means for effecting physical engagement between the driving and driven members independently of said variable torque driving means.

Another object is to provide in a driving mechanism of the foregoing character, novel means whereby the driving member is rendered relatively ineffective whenever the speed of rotation of the driver falls below the critical value.

A still further object is to provide a novel driving mechanism consisting of a plurality of force transmitting members movable radially with respect to a common central point and adapted to exert a variable driving force in response to variations in the speed of rotation of the primary driving member.

The invention is particularly well suited for use as a driving mechanism for a generator serving as a source of electric current for various accessories and devices operating in association with the engine of an airplane or other automotive vehicle. The accompanying drawing shows a satisfactory method of embodying the principles of the invention in a practical form suited for many uses, including the one above suggested. It is to be expressly understood however that the drawings are for the purpose of illustration only and are not designed as a definition of the limits of the invention, reference being had for this purpose to the appended claims.

Figure 1:
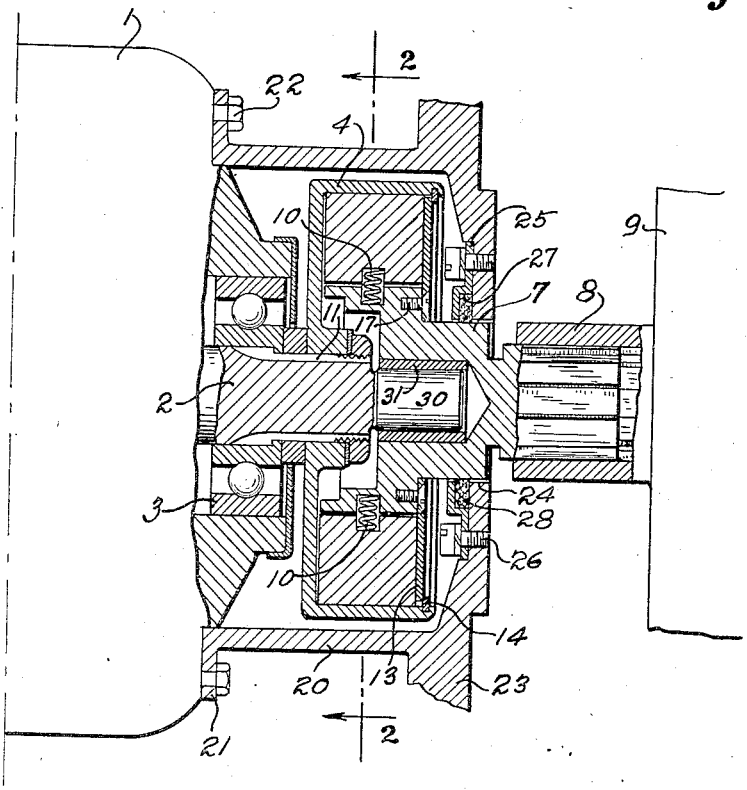
Figure 2:
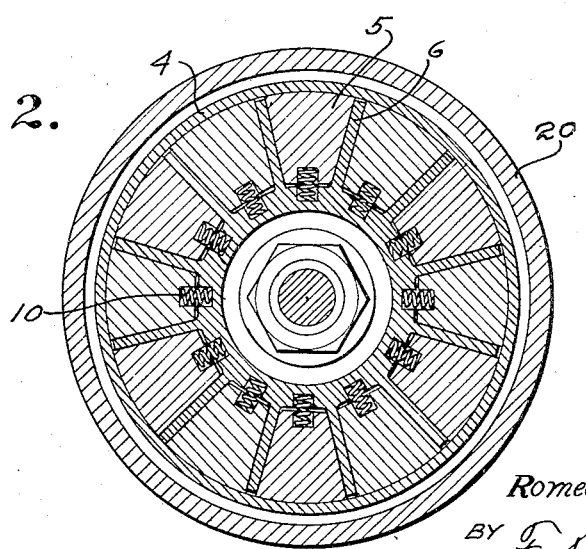

In the drawings, wherein like reference characters refer to like parts throughout the several views, Fig. 1 is a view in elevation, with parts shown in central vertical section, of a driving mechanism embodying the present invention; and Fig. 2 is a transverse sectional view taken on the line 2—2 of Fig. 1.

Referring to the drawings, the invention is shown by way of illustration as applied to a generator 1 or other device to which rotation is to be transmitted, the generator shaft being indicated at 2. As shown the shaft 2 is provided at its end 30 with bearing means 31 on which a radially spoked member 6 having a hub 7 is journalled, a second bearing being shown at 3. Also mounted on shaft 2 is a recessed cylindrical drum 4, the periphery of which encloses the aforesaid spoked member 6. At 9 is indicated a driving unit, such as a gear or other member connecting with a prime mover adapted to furnish power for driving the member 1.

The novel means for effecting a driving connection between the members 9 and 1 comprises a plurality of clutch members 5 adapted to respond to the action of centrifugal force and normally urged outward radially from the hub 7 of the radially spoked member 6, into frictional contact with the inner surface of drum 4. The centrifugal force is created by the rotation of hub 7, which in turn revolves in response to rotation of the driving member 9, on which is provided the socket 8 splined to the extension of hub 7, as shown.

Means are provided for mounting and housing the mechanism in a manner to facilitate assembly and removal of parts, as well as inspection thereof. As shown such means includes a cylindrical casing 20 having a marginal flange 21 adapted to be secured to the housing of member 1 by suitable means 22, the member 20 having at its opposite end another flange 23 adapted to connect with a crank case or housing for member 9 and its associated parts. The closed end of the casing 20 is provided with an opening 24 permitting entry of the shaft 7, suitable dust eliminating means being shown in the form of the collar 25 held in place on the member 20 by suitable means 26, and being provided with a recessed portion 27 for receiving a packing 28.

From inspection of the drawing it will be noticed that there is a certain clearance provided between the hub portion of the spoked member, or spider 6, and the respective radial members 5. It will therefore be evident that the members 5, if free to move toward the hub of spider 6, would do so, thereby decreasing the friction between said members and the inner surface of drum 4. Means are provided, as for example springs 10, to resist such tendency to a certain extent, but such means preferably will of themselves be merely sufficient to prevent such a converging movement of the members 5 while the driving member 7 is stationary, or during rotation of the driving member 7 at relatively low speeds. When, however, the speed of rotation of the member 7 becomes sufficiently high to transmit centrifugal force to members 5 thereby increasing the friction exerted against the drum 4, such action will produce rotation of the drum 4, and hence of the driven shaft 2, at a speed corresponding to the speed of rotation of the prime mover 9, the driven shaft 2 being connected by splines or otherwise suitably keyed to the drum 4, as indicated at 11.

Having thus effected a positive, non-slipping driving connection between the members 9 and 1, the continued rotation of the hub 7 at a speed equal to or greater than that necessary to effect such driving engagement with the drum 4 will serve to maintain such engagement. When, however, the speed of rotation falls below such critical speed the resultant decrease in the centrifugal force exerted upon the members 5 will cause said members to lessen their frictional grip upon the drum 4, and while this will not establish a clearance between the said members and the drum 4 (in view of the provision of springs 10) it will nevertheless permit relative movement, or slippage, between the members 5 and the drum 4. There will therefore continue to be an actual physical engagement between the members 5 and the drum 4; but such engagement is insufficient to constitute a constant, positive driving force. However, if desired, adjustment of the critical speed at which positive driving engagement occurs can be effected by varying the stress in springs 10 or by substituting other springs of different stress.

The blocks 5 are held laterally to their respective pockets by the disc 13 and retaining ring 14, disc 13 being secured to member 7 by suitable means such as screws 17.

From the foregoing it is evident that the invention provides means wherein a driving connection results from the combination of centrifugal and frictional forces, and further provides a novel driving mechanism possessing many advantages in matters of simplicity, compactness of structure, ease of assembly and maintenance, economy in production, and in other obvious respects.

Though there has been illustrated and described only one embodiment of the invention, it is to be understood that the same is not limited to the form shown but may be embodied in various forms. Reference will, therefore, be had to the appended claims for a definition of the limits of the invention.

What is claimed is:

1. In a device of the class described, a rotatable recessed member, a rotatable driving member mounted coaxially within said recessed member and means for transmitting the rotational movement of said driving member to said recessed member, said means comprising a plurality of radially movable clutch elements associated with said driving member and adapted to exert positive driving pressure against the major portion of the inner circumferential surface of said recessed member when said driving member rotates at or above a critical speed, auxiliary means adapted to hold said radially movable members away from the center of rotation of said driving member and in physical contact with said recessed member, said auxiliary means being insufficient, per se, to effect constant driving connection between said driving and recessed members, and a plurality of spokes extending radially from said driving member and snugly fitting between and in constant contact with successive clutch elements to hold the latter against relative angular displacement, and to cause said clutch elements to rotate as a unit with said driving member.

2. In a device of the class described, a drum to be driven, a driving member concentric therewith, said driving member comprising a hub having a plurality of plane-surfaced spokes extending radially therefrom and terminating adjacent the inner circumferential surface of said drum, a plurality of driving clutch elements snugly fitting in the pockets formed by said spokes, said clutch elements having converging radially disposed plane-surfaced sides registering with the corresponding surfaces of said spokes, and arcuate faces registering with the inner surface of the drum, and means for maintaining said arcuate surfaces in contact with said drum.

In testimony whereof I have signed this specification.

ROMEO M. NARDONE.